United States Patent
Baues

[11] 4,054,362
[45] Oct. 18, 1977

[54] DEVICE FOR MODULATING LIGHT
[75] Inventor: Peter Baues, Krailling, Germany
[73] Assignee: Siemens Aktiengesellschaft, Berlin & Munich, Germany
[21] Appl. No.: 611,920
[22] Filed: Sept. 10, 1975
[30] Foreign Application Priority Data
Sept. 12, 1974   Germany ............................ 2443733
[51] Int. Cl.² ................................................ G02B 5/14
[52] U.S. Cl. ........................... 350/96 WG; 350/160 R
[58] Field of Search ...................... 350/96 WG, 160 R
[56] References Cited
U.S. PATENT DOCUMENTS

| 3,464,762 | 9/1969 | Kahng | 350/96 WG X |
| 3,811,912 | 5/1974 | Ramaswamy | 350/96 WG X |
| 3,813,142 | 5/1974 | Buhrer | 350/96 WG |
| 3,923,376 | 12/1975 | Martin | 350/96 WG |

OTHER PUBLICATIONS

Channin, D. J., "Optical Waveguide modulation using nematic Liquid Crystal", Appl. Phys. Lett., vol. 22, No. 8, Apr. 15, 1973 pp. 365–366.
Sheridan, J. P., Giallorenzi T. G., "Electro-optically induced deflection in liquid crystal waveguides", J. of Applied Physics, vol. 45, No. 12, Dec. 1974 pp. 5160–5163.

Primary Examiner—John K. Corbin
Assistant Examiner—Rolf Hille
Attorney, Agent, or Firm—Hill, Gross, Simpson, Van Santen, Steadman, Chiara & Simpson

[57] ABSTRACT

A device for modulating light characterized by an electro optical crystal which is either a solid crystal or a liquid crystal having an index of refraction greater than the index of refraction of the substrate on which the crystal is disposed and having a surface opposite the substrate covered with a dielectric material having an index of refraction less than the index of refraction of the crystal. A plurality of strip electrodes are disposed on the layer with adjacent electrodes connected to different terminals to form an interdigital electrode structure. When a modulating voltage is applied to the interdigital electrode structure, electrical fields are created between the electrode strips extending parallel to the direction of light propagation in the crystal to change the index of refraction to cause modulation of the light.

10 Claims, 4 Drawing Figures

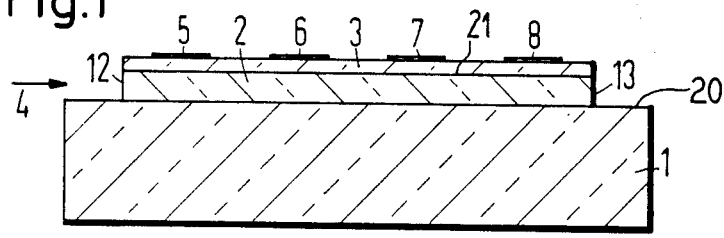
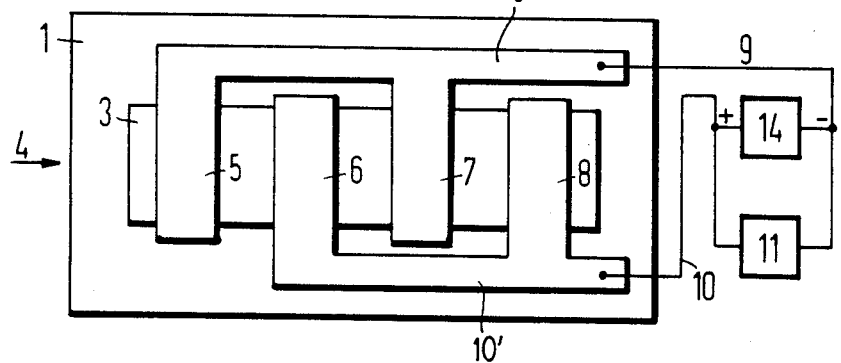
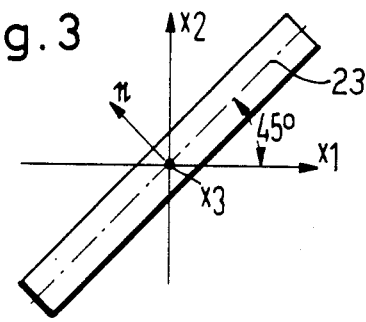
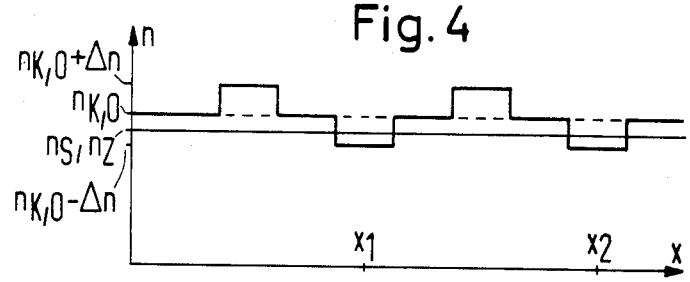

DEVICE FOR MODULATING LIGHT

BACKGROUND OF THE INVENTION

1. Field of the Invention

The present invention is directed to a device for modulating polarized light and can be used either as an amplitude modulator or a controlled filter.

2. Prior Art

For modulating light, a suggested device has electrode strips, which are arranged on an electro-optical crystal with their longitudinal axes coinciding with the direction of propagation of light in the crystal. This device works according to the principle of diffraction of the light to cause modulation. An example of this device is disclosed by M.A.R.P. DeBarros, M.G.F. Wilson and C. Eng, "High-Speed Electro-Optic Diffraction Modulator For Base Band Operation", Proceedings of I.E.E., Vol. 119, No. 7, July 1972, pages 807–814. This device permits high modulation velocities, but it exhibits a relative low modulation efficiency.

SUMMARY OF THE INVENTION

The present invention is directed to a device for modulating light which has a high modulation efficiency. To accomplish this task, the device comprises a substrate of material having an index of refraction $n_S$; an electro-optical crystal of a material having an index of refraction $n_{K,o} < n_S$ disposed in an integrated manner on a surface of the substrate to form a waveguide, a layer of dielectric intermediate material having an index of refraction $n_Z < n_{K,o}$ covering a surface of the electro-optical crystal which is opposite to the substrate; a plurality of electrode strips disposed on the layer with adjacent strips connected to different poles or terminals to form an interdigital electrode structure, each of said strips having a width equal to an integral multiple of $\pi$ of the propagation phase of the waveguide mode of the electro-optical crystal, and means for applying a voltage to the electrode strips whereby application of a modulation voltage to the interdigital structure creates electrical fields in the crystal extending parallel to the direction of propagation of the light in the crystal to create changes in the index of refraction of the crystal.

When no electrical field is applied to the electrode structure, the electro-optical crystal acts as a waveguide and a polarized light striking the electro-optical crystal is conducted therethrough. However, if the voltage is applied to the electrode strips, electrical fields are produced in successively opposite directions beneath the electrode strips in the crystal and extend parallel to the propagation direction of the light. These fields generate variations in the index of refraction in the crystal and a light passing through the crystal is multiply reflected. If the width of the electrode strips are equal to an integral multiple of $\pi$ of the propagation phase of the waveguide mode, and according to known optical laws, the spacing or intervals between adjacent electrode strips are selected to be dependent upon the wavelength of the light portions or components to be modified, interferences between the individual light components or portions will occur. By selecting the voltage applied to the electrode strips, the intensity of the light being transmitted through the crystal can be varied between a maximum intensity and a total extinction.

The electro-optically caused variations in the index of refraction are varyingly high for various electro-optical crystals. In the case of small variations in the index of refraction, materials having an index of refraction $n_S$ or $n_Z$ are selected for the substrate upon which the electro-optical crystal is arranged and for the dielectric intermediate layer which is disposed on top of the electro-optical crystal, and these index of refractions $n_S$ and $n_Z$ are slightly smaller than the effective index of refraction of the electro-optical crystal. An improved operability of the modulation arrangement or device is thereby achieved.

In order to obtain the greatest possible change in light transmission through the crystal as a function of the voltage change at the electrode strips, the electrode strips are in particular connected to a bias voltage source.

The electro-optical crystal can be either a solid crystal or a liquid crystal. When a liquid crystal is used, light transmissive spacing pieces are arranged to limit the length of the crystal and to act as light transparent surfaces.

Neumatic liquid crystals, which are to be utilized as the electro-optical crystal, behave optically like uniaxial crystals with positive or negative double refraction. For example, their optical axes extend parallel to the molecular longitudinal axes. The neumatic liquid crystals exhibit an anisotropy of a dielectric constant $\Delta_\epsilon = \epsilon_{11} - \epsilon_1$ in which $\epsilon_{11}$ is dielectric constant parallel to the molecular longitudinal axes and $\epsilon_1$ is a dielectric constant vertical or perpendicular to the molecular longitudinal axes. After reaching a specific voltage in the electrical field applied between the electrodes, a neumatic liquid crystal with a negative anisotropy of a dielectric constant ($\Delta_\epsilon = \epsilon_{11} - \epsilon_1 < 0$) will be deformed to cause a change in the indices of refraction of the liquid crystal. Therefore, as in the case of solid electro-optical crystals, sharp changes in the index of refraction will occur at the boarder areas between the field permeated and the field-free regions and these sharp changes produce index of refraction steps or stages. In the case of a neumatic liquid crystal, these index of refraction stages or steps produced by the electrical fields are several powers of ten greater than in the case of a solid electro-optical crystal.

The device of the present invention can be used as a modulator to produce pulse code modulated signals for transmissions of communication. The device can also be used as a controlled filter.

BRIEF DESCRIPTION OF THE DRAWINGS

FIG. 1 is a cross section of an embodiment of the device according to the present invention;

FIG. 2 is a plan view of the device of FIG. 1;

FIG. 3 is a diagrammatic illustration showing the orientation of the electro-optical crystal on a substrate; and FIG. 4 is a diagrammatic illustration of the changes in the indices of refraction.

DESCRIPTION OF THE PREFERRED EMBODIMENTS

The principles of the present invention are particularly useful when incorporated in a device for modulating light illustrated in FIGS. 1 and 2 which device is an exemplary embodiment of the invention.

The device includes a substrate 1 which consists of glass and which has an upper surface 20. An electro-optical crystal 2 is applied on the surface 20 of the substrate 1 and has an upper or exposed surface 21 which is opposite to the surface engaging the surface 20. A layer of dielectric material 3 covers the surface 21 of the crystal 2.

A plurality of electrode strips 5, 6, 7 and 8 are disposed on the layer 3 and extend transverse and perpendicular to the direction 4 of light entering the crystal. As best illustrated in FIG. 2, adjacent electrode strips are connected to different poles or terminals so that electrode strips 5 and 7 are interconnected by a portion 9' while electrode strips 6 and 8 are interconnected by a portion 10' to form an interdigital electrode structure. To apply a modulating voltage to the interdigital electrode structure, means for applying a voltage including a modulation voltage source 11 is connected to the electrode strips 5 and 7 by a lead 9 and connected to the strips 6 and 8 by a lead 10. When a modulating voltage is applied to the electrode strips, electric fields are produced in the electro-optical crystal 2 parallel to the direction 4 of a light passing through the crystal and also in the opposite direction. The application of these electrical fields produce variation in the index of refraction of the electro-optical crystal with more or less sharp changes in the boundary between the areas having a field and free of the field to produce a stepwise index of refraction profile. Light entering the crystal 2 in the direction of arrow 4 is reflected by these steps or areas of change in the index of refraction.

The electro-optical crystal 2 may be either a solid crystal for example KDP or a neumatic liquid crystal layer with a thickness of a few micrometers. In the case of a liquid crystal layer, it must be limited at the edges such as 12 and 13 by spacing pieces, not illustrated, which spacing pieces are light transmissive.

The device of the invention whether it uses a solid crystal as the electro-optical crystal or a liquid crystal may be utilized for the purpose of pulse modulation in an optical communication system. In such utilization, a light, which is polarized and monochromatic, is directed into the electro-optical crystal 2 from the direction 4. The widths of electrode strips 5-8 as well as their intervals from one another is selected depending upon the wavelength of the light in such a way that in the presence of electric voltage applied to the electrode strips, the light becomes totally extinguished by interference. Thus, the device, which is totally transparent when no voltage is applied to the electrodes 5-8, will not pass light when a selected voltage is applied to the electrodes.

In order to keep the modulating voltage as low as possible, a bias voltage is applied to the electrodes. Thus, the means for applying voltage includes a bias voltage source 14 which is connected to the leads 9 and 10 in parallel to the modulating voltage source 11.

According to FIG. 3, a solid, electro-optical crystal 2 of a crystal class $\bar{4}2m$, for example KDP, is cut from a crystal block in such a way that the light propagates itself in the $x_3$ direction, i.e. along the optical axis of the electro-optical crystal, which direction $x_3$ is illustrated as being perpendicular to the plane of the drawing of FIG. 3. A normal direction $n$ on the crystal coincides in the plane formed by the crystallographic $x_1$ axis and the crystallographic $x_2$ axis either with a line which is a bisector of the angle between the $x_1$ axis and $x_2$ axis or with a line which is perpendicular to the bisector. As illustrated, the crystal 2 is cut with its transverse axis 23 being at an angle of 45° to the crystallographic $x_1$ axis. In this arrangement, the greatest electro-optical change in the index of refraction will be obtained.

Referring to FIG. 4, the relationship of the index of refraction of the electro-optical crystal 2, the substrate 1 and the dielectric material 3 is described. The indices of refraction are illustrated above the points x in the electro-optical crystal. In a field-free state, the crystal 2 exhibits an index of refraction $n_{K,O}$ over the entire length through which the light passes. The index of refraction of the substrate $n_S$ and the dielectric intermediate material $n_Z$ are both somewhat smaller so that a wave guide exists for light passing through the electro-optical crystal. In the presence of successive electrical fields of varying directions, the longitudinal electro-optical effect causes the index of refraction at given points in the crystal to be changed by $\pm \Delta n$. The light which is passing through the crystal will be reflected at these changes of the index of refraction. If the difference in the index of refraction $(n_{K,O}-n_S)$ or $(n_{K,O}-n_Z)$ is smaller than $\Delta n$, the profiles of the index of refraction occur in the direction of light propagation so that light passing through the crystal is lost to the exterior as a consequence of leakage wave radiation. This increases the impermeability of the crystal to light in the areas which are in the field penetrated state.

In conclusion, it is pointed out that by prescribing the widths and interval of the electrode strips 5-8, in the field penetrating state, a prescribed intensity variation between J minimum $>$ and J maximum of the light passing through the crystal can be obtained.

Although various minor modifications may be suggested by those versed in the art, it should be understood that I wish to employ within the scope of the patent granted hereon, all such modifications as reasonably and properly come within the scope of my contribution to the art.

I claim:

1. A device for modulating polarized light comprising a substrate of material having an index of refraction $n_S$; an electro-optical crystal of a material having an index of refraction $n_{K,O}>n_S$ disposed in an integrated manner on a surface of the substrate to form a waveguide, a layer of dielectric intermediary material having an index of refraction $n_Z<n_{K,O}$ covering a surface of the electro-optical crystal which is opposite to the substrate; a plurality of electrode strips disposed on the layer to extend perpendicular to the direction of propagation of light in the waveguide with adjacent strips connected to different poles to form an interdigital electrode structure, each of said strips having a width equal to an integral multiple of $\pi$ of the propagation phase of the waveguide mode of the electro-optical crystal, and means for applying a voltage to said electrode strips whereby application of a modulation voltage to the interdigital structure creates electrical fields in the crystal extending parallel to the direction of propagation of the light in the crystal to create changes in the index of refraction of the crystal.

2. A device according to claim 1, wherein the device is an amplitude modulator.

3. A device according to claim 1, wherein the device is a controlled filter.

4. A device according to claim 1, wherein the material of the electro-optical crystal is a liquid crystal and which device includes light transmissive spacing pieces limiting the crystal and defining the light penetrating surfaces.

5. A device according to claim 4, wherein the means for applying a voltage includes means for applying a bias voltage to the electrode strips.

6. A device according to claim 1, wherein the material of the electro-optical crystal is a solid crystal.

7. A device according to claim 6, wherein the electro-optical crystal is cut from a block crystal in such a way that it is arranged on the substrate in order that the waveguide mode of the light is propagated in the $x_3$ direction in the crystal and the normal direction $n$ on the waveguide in the $x_1,x_2$ plane coincides with a line which is selected from a group of lines consisting of a bisector of the angle between the $x_1$ axis and the $x_2$ axis and a line perpendicular to said bisector.

8. A device according to claim 1, wherein the means for applying a voltage includes means applying a bias voltage to the electrode strips.

9. A device according to claim 8, wherein the material of the electro-optical crystal is a solid crystal.

10. A device according to claim 9, wherein the solid crystal is cut from a crystal block in such a way that it is orientated on the substrate with the waveguide mode of the light being propagated in the $x_3$ direction of the crystal and that a normal direction $n$ on the waveguide in the $x_1,x_2$ plane coincides with a line which is selected from a group of lines consisting of a bisector of the angle between the $x_1$ axis and $x_2$ axis and a line perpendicular to the bisector of the angle between the $x_1$ axis and the $x_2$ axis.

* * * * *